United States Patent [19]

Magnusson et al.

[11] 4,148,554
[45] Apr. 10, 1979

[54] METHOD OF PROVIDING RECESSED OPTICAL FIBER ENDS FOR USE IN CONNECTOR STRUCTURES

[75] Inventors: John M. Magnusson, Richfield; Bryon J. Croak, St. Paul, both of Minn.

[73] Assignee: Minnesota Mining and Manufacturing Company, St. Paul, Minn.

[21] Appl. No.: 822,268

[22] Filed: Aug. 5, 1977

[51] Int. Cl.² ............................................. G02B 5/14
[52] U.S. Cl. .............................. 350/96.21; 350/96.17; 350/320
[58] Field of Search ............... 350/96.15, 96.17, 96.18, 350/96.20, 96.21, 178, 320; 51/5 C, 209 DL, 281 R, 284, 284 E, 323; 29/90 R; 65/61

[56] References Cited

U.S. PATENT DOCUMENTS

| | | | |
|---|---|---|---|
| 3,704,996 | 12/1972 | Borner et al. | 350/96.15 |
| 3,849,947 | 11/1974 | Bunkoczy | 51/281 R |
| 3,861,781 | 1/1975 | Hasegawa et al. | 350/96.21 |
| 3,910,677 | 10/1975 | Becker et al. | 350/96.18 |
| 3,932,184 | 1/1976 | Cohen et al. | 350/96.18 X |
| 3,972,585 | 8/1976 | Dalgleish et al. | 350/96.21 |
| 4,005,522 | 2/1977 | Dalgleish et al. | 29/517 |
| 4,008,948 | 2/1977 | Dalgleish et al. | 350/96.21 |
| 4,087,158 | 5/1978 | Lewis et al. | 350/96.21 |

Primary Examiner—John K. Corbin
Assistant Examiner—John D. Lee
Attorney, Agent, or Firm—Cruzan Alexander; Donald M. Sell; William B. Barte

[57] ABSTRACT

A connector structure for separably connecting optical fibers includes a pair of precision sleeves, each of which is adapted to surround one of the fibers such that the ends thereof are in axial alignment. A housing fitted around the sleeves maintains that alignment. After each fiber is fitted into a matching sleeve such that end portions thereof protrude through the sleeve, the fiber is permanently anchored therein to prevent relative motion and the end of the sleeve and fiber combination is ground substantially flat and perpendicular to the fiber axis. The end of the combination is then polished under a predetermined set of conditions selected to be consistent with predetermined wear characteristics of the sleeve and fiber in which the fiber is less wear resistant than the sleeve. During the polishing operation the fiber end becomes convex and recessed within the sleeve. A pair of fibers may thus be optically coupled by butting together the ends of two sleeves within an outer housing. The recess in the fiber end precludes scratching or chipping of the fiber due to contact with other members.

24 Claims, 5 Drawing Figures

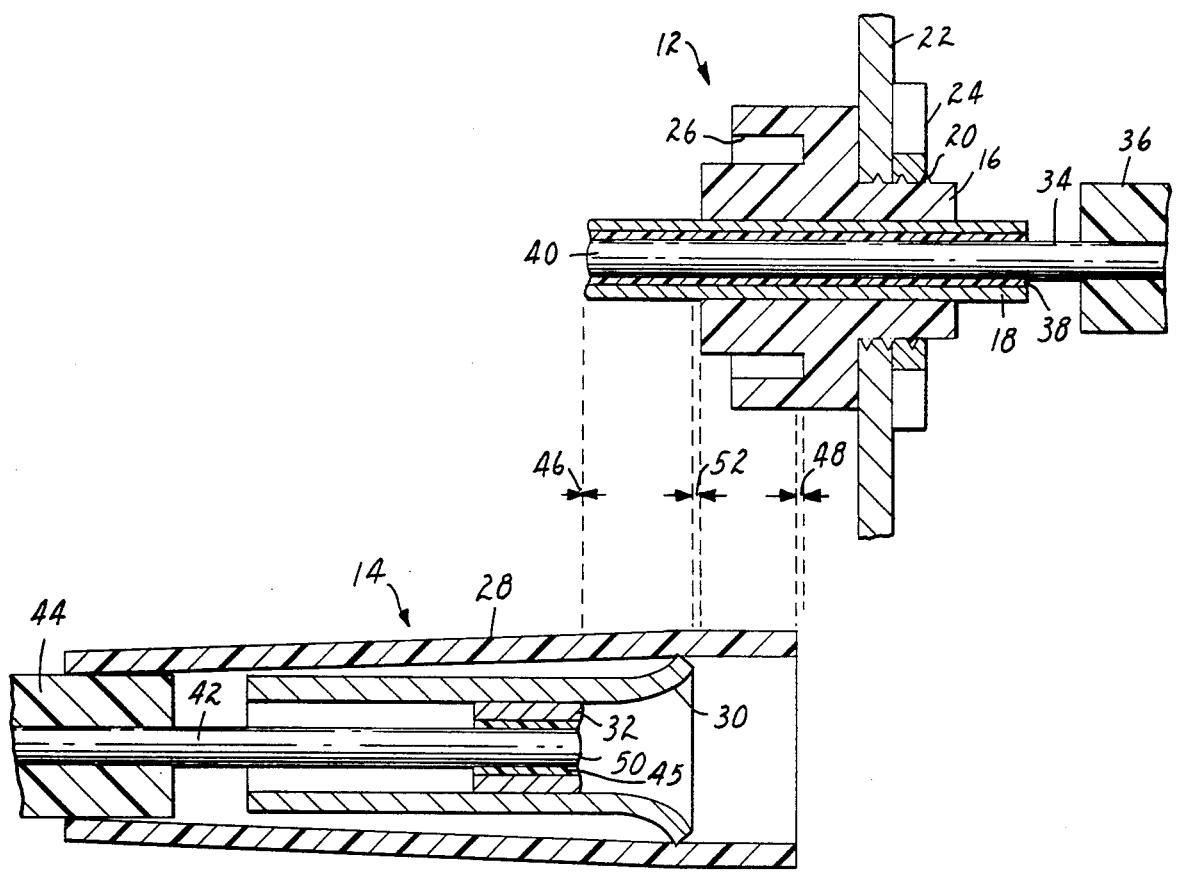
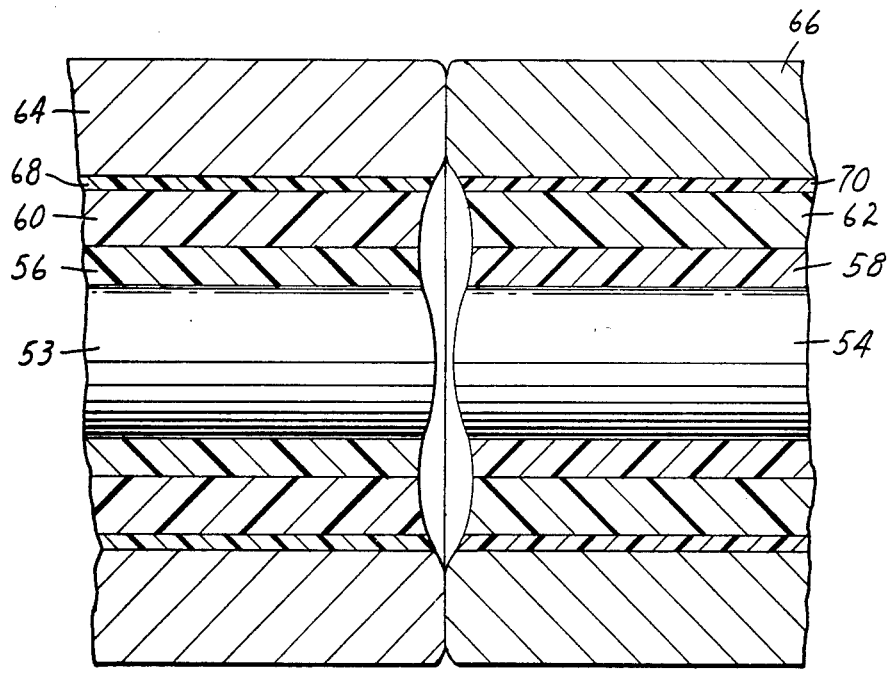

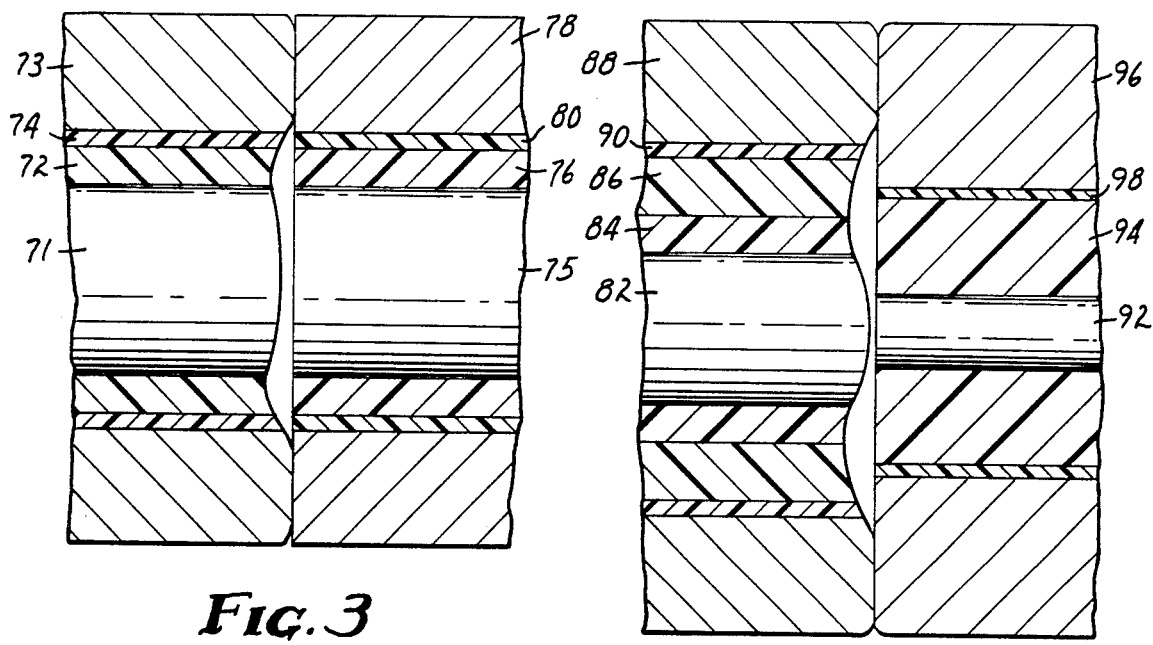
FIG. 3
FIG. 4
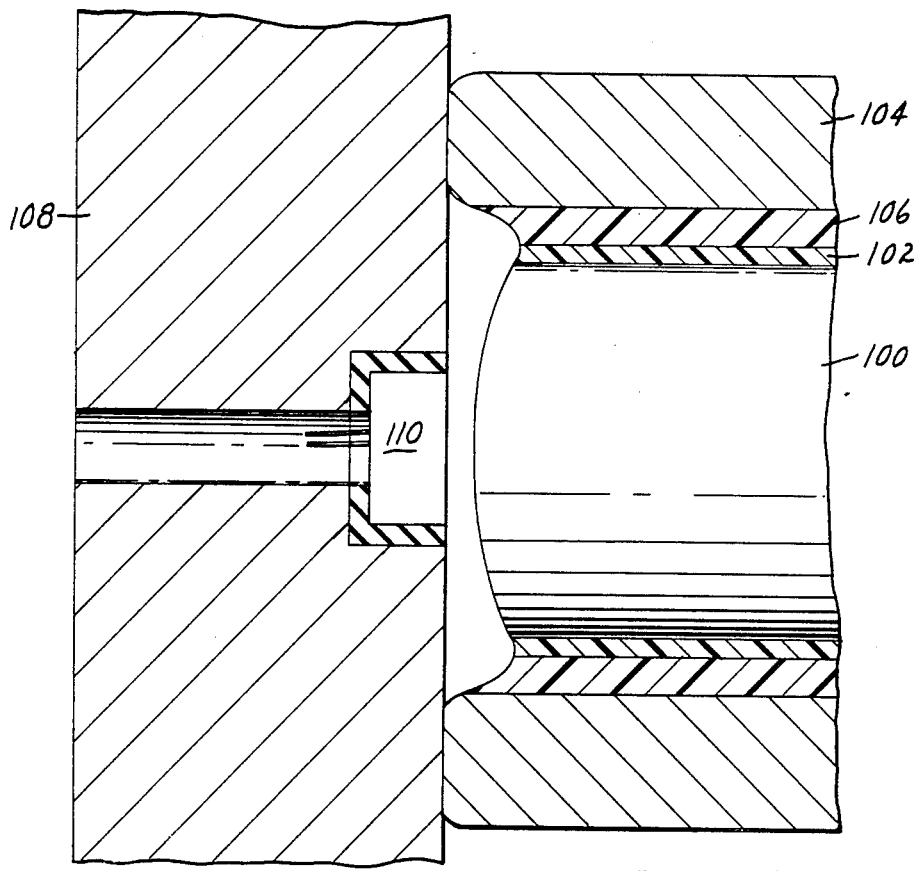
FIG. 5

METHOD OF PROVIDING RECESSED OPTICAL FIBER ENDS FOR USE IN CONNECTOR STRUCTURES

BACKGROUND OF THE INVENTION (1) Field of the Invention

This invention relates to fiber optics and in particular to connectors for optical fibers in data communications systems.

(2) Description of the Prior Art

The concept of using optical fibers in data communications is now well established. See, for example, "Fiber Optic Developments Spark Worldwide Interest," R. Gundlach, Electronics, Aug. 5, 1976. Regardless of the desirable features of interference-free, large bandwidth communications which are envisioned, the commercial utilization of such data transmitting links has been impeded by the problems of making reliable, inexpensive and low-loss connection between fibers or between a given fiber and an associated optical element such as a light source or photodetector. Such connections must address at least three types of problems: axial alignment, longitudinal alignment or gap between associated members, and angular alignment.

Axial alignment is commonly achieved by use of precision sleeves which conform precisely to the outer diameter of the fiber, thereby guiding fibers inserted therein into axial position such that they may then be secured in place. U.S. Pat. Nos. 3,972,585, 4,005,522 and 4,008,948 (Dalgleish et al) depict various connectors employing sleeves into which exposed fiber ends are directly inserted.

Such connectors address the problem of longitudinal alignment or end gap by positioning the fiber ends to extend a predetermined distance such that when the respective ends are inserted from opposite ends of the sleeve, they meet at a predetermined position to abut or to be in very close end to end relationship (see Column 2, lines 39–41 of U.S. Pat. No. 3,972,585). Typical connectors require extensive time-consuming jigging operations to ensure proper positioning of the fiber ends, or utilize small gaps and index matching fluids to prevent scratching and damage to the fiber ends due to mutual contact.

In order to avoid such jigs and precise positioning of the fiber ends, techniques are also known for encasing an end of an optical fiber in a sleeve or other terminal member and of then polishing and/or grinding the joined end of the fiber and terminal member, causing both members to become coplanar and optically flat (see U.S. Pat. No. 3,861,781, Hasegawa et al, Column 2, lines 39–43). The polished fiber ends are then positioned by butting together the surrounding sleeves within a third close fitting shroud. Since the fiber ends are planar with the sleeves, such systems do not avoid problems associated with scratching or chipping of the fiber ends due to frictional contact.

SUMMARY OF THE INVENTION

The present invention is directed to a separable connector adapted for providing an optical coupling between an optical fiber and an associated optical element such as another optical fiber, a light source or photodetector, in which problems associated with axial and longitudinal alignment, elaborate jigging and scratching or chipping of the mating fiber end is avoided.

In the present invention, the connector includes a housing member which may be molded about an end of an optical fiber or which may have an opening extending between a front portion and a rear portion through which an optical fiber may be inserted. Preferably, the end of the fiber is positioned slightly protruding beyond the end of the front portion. Further, the housing member preferably has anchored therein a tubular sleeve having a circular opening extending therethrough, which sleeve thus provides the opening through which an optical fiber may be inserted. The opening through the housing member, or sleeve if so provided, is selected to be slightly greater than that of an optical fiber to be used therewith. Further, the front portion of the housing member surrounding the opening through which an optical fiber inserted therethrough may protrude is selected of a material exhibiting a rate of wear less than that of the fiber when both are polished under a predetermined set of polishing conditions. Preferably, the optical fiber will comprise a core material of a high index material concentrically surrounded by a cladding layer of lower index material. In such a case, the core material will be selected to exhibit a rate of wear less than that of the surrounding cladding materials, but greater than that of the sleeve.

The connector of the present invention further includes means for permanently anchoring the fiber centered within the opening in the housing member and in the protruding position to prevent relative motion therebetween. After the fiber is thus anchored, the front portion of the housing member and protruding fiber end may be ground to provide substantially planar ends which are perpendicular to the axis. The planar ends may subsequently be polished under the predetermined set of polishing conditions to cause the fiber end to be polished smooth and slightly recessed within the front portion of the housing member as a result of differences in the rates of material removal.

The housing member further includes means for enclosing the fiber-sleeve combination and for maintaining the recessed fiber end axially aligned with, and the planar front portion of the housing member axially butted-up against an associated optical element such as another fiber, light source or photodetector to ensure axial alignment and for enclosing the interface therebetween to prevent foreign impurities from contacting the fiber end, thereby minimizing optical losses. Even though the end of the sleeve is butted-up against another member, the recess of the fiber end within the sleeve results in a small gap along the axis between the fiber end and the associated optical element, and thereby prevents degradation in optical efficiency as may otherwise result from chipping and scratching of the fiber end. For example, such chipping and scratching and attendent scattering of light at the end may otherwise arise both when mating connectors are being connected or disconnected and also as a result of vibrations during actual use.

In a preferred embodiment, the connector structure includes a pair of tubular sleeves, each of which is adapted for receiving an end of an optical fiber to be optically coupled to the other fiber. In such an embodiment, the end portion of at least one sleeve and associated fiber end may be polished to provide a smooth and recessed fiber end. The housing is then adapted to receive the ends of both sleeves axially butted together.

The present invention also encompasses a method for optically coupling an optical fiber to an associated optical element such as another optical fiber, light source or photodetector. The method includes the step of providing a previously described housing member having a front portion exhibiting a rate of wear under a predetermined set of polishing conditions which is less than that of the fiber to be optically coupled. The fiber is then inserted into the rear portion of the opening through the housing member such that the end of the fiber protrudes beyond the front portion and is permanently anchored in that position to prevent relative movement. The protruding end of the fiber and front portion of the housing member are then ground to provide substantially co-planar ends on the front portion and on the fiber which are perpendicular to the fiber axis, and the co-planar ends are polished under the predetermined set of polishing conditions to provide a smooth and slightly recessed fiber surface within the end portion of the housing member as a result of a difference in the rates of removal of the respective materials associated with their different rates of wear. Preferably, the polishing step includes the step of polishing the co-planar ends against a resilient and partially conformable polishing surface loaded with a preselected polishing compound. The resiliency, surface character, pressure and polishing compound are selected such that the more wear resistant members such as the housing member are less affected, while the surface of the resilient member conforms into the less wear resistant members such as the fiber and even softer cladding materials, jacketing and adhesives, resulting in their preferential removal. In an especially preferred embodiment in which such cladding members are provided and a deeper recess in the area of the cladding layers results, the fiber end desirably becomes convex, thereby both protecting the fiber surface and tending to focus light passed therethrough.

BRIEF DESCRIPTION OF THE DRAWING

FIG. 1 is a cross-section of a connector structure according to the present invention;

FIG. 2 is an expanded cross-section of a portion of a fiber to fiber connector structure such as that shown in FIG. 1, showing the details of the fiber end interface;

FIG. 3 is an expanded cross-section of another fiber to fiber interface;

FIG. 4 is an expanded cross-section of a portion of another connector adapted for use with fibers of differing diameters; and FIG. 5 is an expanded cross-section of a portion of another connector adapted to couple an optical fiber to an associated optical device such as a light emitting diode.

DESCRIPTION OF THE PREFERRED EMBODIMENTS

A preferred construction of the connector of the present invention shown in FIG. 1 comprises a bulkhead assembly 12 and a jack assembly 14. The assemblies 12 and 14, respectively, are shown in an offset relationship such that the relative positioning of the various members therein may be more clearly discerned. Also, in FIG. 1, the relative dimensions perpendicular to the axis of the respective fibers have been exaggerated so as to enable the members to be more clearly depicted.

In the embodiment shown in FIG. 1, the bulkhead assembly 12 is shown to include a molded plastic outer housing 16 and a stainless steel sleeve 18 which is press-fit and bonded to the housing. The housing 16 is provided with a rear threaded section 20 enabling it to be bolted to a bulkhead 22 by means of a nut 24 in a conventional manner. A forward portion of housing 16 is provided with a recess 26 enabling a mating portion of the jack assembly to be received therein. The stainless steel sleeve 18 protrudes forward of the housing 16 and is terminated in a manner to be described hereinafter.

The jack assembly 14 also includes an outer housing member 28 within which is press-fit a metal ferrule member 30 and within which is press-fit a stainless steel sleeve 32.

The manner in which the stainless steel sleeves 18 and 32, respectively, of the bulkhead assembly 12 and jack assembly 14 are fitted to respective optical fibers and terminated to complete the connector assemblies constitutes an important aspect of the present invention and may now be described with reference to the connector members described hereinabove.

The bulkhead assembly 12 is designed to be used to terminate an optical fiber 34 which is enclosed within an outer jacket 36. The fiber 34 may typically also include an outer cladding layer which has a lower index of refraction than that of the fiber, which is not shown in FIG. 1 for purposes of clarity. When such a fiber is to be used with the bulkhead assembly 12, a section of the jacket 36 is removed so as to allow the fiber 34 to protrude beyond the end of the jacket 36 an arbitrary distance greater than the overall length of the bulkhead assembly 12. The fiber 34 and a stainless steel sleeve 18 are selected such that the outer diameter of the fiber 34 is substantially equal or slightly less than the inside diameter of the sleeve 18. The fiber is then inserted through the sleeve 18 such that the end of the fiber protrudes a slight distance beyond the end of the sleeve. The fiber is then permanently anchored within the sleeve with a suitable adhesive 38 such as an epoxy resin so as to prevent relative movement therebetween. After the adhesive has set, such as by curing of the epoxy resin, an excess amount of fiber protruding beyond the end of the sleeve is snipped off close to the end of the sleeve 18. The ends of the sleeve and fiber are then ground with a suitable mesh abrasive to remove damaged end portions of the fiber and to cause the respective ends of the fiber and sleeve to be flush and perpendicular to the axis of the fiber.

At this stage, a critical phase of the assembly of the connector of the present invention is then carried out. The end 40 of the fiber 34 is caused to be recessed within the end of the sleeve 18 and a convex curvature provided on the fiber 34 by undercutting the fiber ends while the fiber and sleeve ends are being polished. This undercutting occurs during a polishing operation during which predetermined polishing conditions are employed, which conditions must be selected depending upon the characteristics of the optical fiber and sleeve materials. For example, it has been found that a recess in the fiber end results if, for a given polishing lap and polishing compound, the wear characteristics of the sleeve and fiber are such that the fiber is less wear-resistant than the sleeve, i.e., that more of the fiber will be removed during the polishing operation. It has been found that it is difficult to predict whether such an undercutting will result for a given sleeve and optical fiber construction when used with a particular lap material and/or polishing compound without the specific combination actually being tried. In any event, as set forth in the various examples hereinafter, when the appropriate materials are present and the respective fiber and sleeve combinations are polished on the appropriate lap impregnated with an appropriate polishing compound, the fiber will become recessed as shown in FIG. 1.

The other half of the connector assembly of FIG. 1, i.e., the jack assembly 14, is assembled in a similar fashion. In that assembly, an optical fiber 42 enclosed within a jacket 44 is first prepared by trimming the jacket to cause the fiber 42 to extend at least a suitable distance beyond the end of the jacket 44. The fiber 42 is then inserted through a stainless steel sleeve 32 of suitable diameter so as to closely surround the fiber and is caused to protrude therethrough such that any chipped or damaged portions of the fiber ends are exposed beyond the end of the sleeve 32. The fiber 42 is then permanently anchored within the sleeve 32 by a suitable adhesive 45 such as an epoxy resin. After the adhesive has set, the ends of the fiber-sleeve combination are ground with a suitable mesh abrasive to remove damaged end portions of the fiber to form the ends to be flush with each other, perpendicular to the axis of the fiber. Preferably, the ends are then also polished to form a recessed convex end on the fiber as described above.

The relative position of the sleeve 32 with respect to the end of the jacket 44 is critical only insofar as it will be desirable that the jacket 44 extend a short distance within the outer housing 28 of the jack assembly to protect the exposed section of the fiber. More critically, the sleeve 32 must be positioned within the ferrule 30 and the ferrule 30 within the housing 28 such that when the assembled members of the jack assembly 14 are inserted into the bulkhead assembly 12, the respective sleeves 18 and 32 are caused to butt against each other with no gap separating those members as shown by the facing arrows 46. In contrast, when the members are so assembled, the forward ends of the housing 28 will be received within the recess 26 of the housing of the bulkhead assembly so as to result in a small gap 48, while the leading edge of the ferrule 30 is separated from the housing 16 of the bulkhead assembly by a small gap 52. The gaps 48 and 52 ensure that the facing edges of the sleeves 18 and 32 are butted together and that the ends of the fibers 40 and 50 are recessed in close proximity to each other to optimize optical coupling while preventing chipping or scratching of the fiber ends due to contact to the respective members. The flared end of the ferrule 30 further ensures that the sleeve 18 is readily inserted therein and is maintained in axial alignment with the corresponding sleeve 32 of the jack assembly 14. Further, a slight rounding of the ends of the sleeves 18 and 32 which results during the grinding and polishing operations further improves the ease with which the respective sleeves are inserted into the ferrule 30.

It will be readily appreciated that a recess within one of the two mating members will be sufficient to prevent scratching of the optical fibers therewithin due to contact with the other fiber. Thus it is sufficient that only one of the optical fibers 34 or 42 be polished so as to provide a recessed surface 40 or 50, respectively, while yet ensuring that the ends of the fibers do not come in contact so as to preclude chipping or scratching during assembly and use. However, to prevent chipping or scratching of the fiber end by other elements such as the opposing sleeve, ferrule, etc., both fibers are preferably recessed.

A further desirable attribute of the connector assembly of the present invention is that during the polishing operation, the optical fiber becomes both recessed within the sleeve and is also caused to have a slight convex curvature, which tends to focus light passing into or out of the fiber and thus collects light which may otherwise be lost in the interface between the fiber end and the adjoining optical element.

An expanded cross sectional view of the interface between two joined optical fibers such as the fibers 34 and 42 of FIG. 1 is shown in FIG. 2. In FIG. 2, two 8 mil (200 $\mu$m) diameter silica glass core fibers 53 and 54 are surrounded by 2 mil (50 $\mu$m) layers of a low index silicone material 56 and 58, respectively, and the silicone layers are in turn surrounded by 3 mil (75 $\mu$m) concentric jackets of "Hytrel" plastic 60 and 62, respectively. In the embodiment shown in FIG. 2, the entire fiber assemblies including both the inner core as well as the clad and jacketing layers, were inserted through stainless steel sleeves 64 and 66 such that the ends of the fiber assembly protruded beyond the end of the sleeves, whereupon the assemblies were permanently anchored to the sleeve by means of an epoxy resin adhesive 68 and 70, such as the "Five Minute Epoxy" manufactured to Devcon Corporation. In the embodiment of FIG. 2, the overall diameter of the fiber assembly was approximately 18 mils (450 $\mu$m), thus a stainless steel sleeve having an outer diameter of 32 mils (812 $\mu$m) and an inside diameter of 19.5 mils (495 $\mu$m) was used, allowing a radial gap of approximately 0.75 mils (19 $\mu$m) for the adhesive.

Each of the fibers 53 and 54 were prepared by inserting them into the respective stainless steel sleeves 64 and 66 such that approximately 1 mm of the respective fiber cladding and jacket assemblies extended beyond the end of the stainless steel sleeves. A 2.5 cm diameter lap covered with fresh 600 mesh silicon carbide abrasive paper wet with water was utilized to grind the fiber to within about 125 $\mu$m of the stainless steel sleeve. A second lap of worn 600 mesh silicon carbide abrasive paper wet with water was then utilized to grind the fiber flush with the stainless steel sleeve. The polishing and undercutting operation was accomplished using American Optical Company M309 rouge (ferric oxide) impregnated on a synthetic leather poromeric lap surface material, such as that manufactured by the Geos Company, Mt. Vernon, New York as the "Politex Pix" polishing pad. The thus prepared lap surface was wet with water and was rotated at approximately 770 rpm. The fiber-sleeve ends were pressed against the lap surface with a force of approximately three Newtons, resulting in a final polish in approximately five minutes. The end of the fiber core was observed to have a convex surface in which the center portion of the core was undercut from the plane of the stainless steel sleeve approximately 0.5 mils (12 $\mu$m) while the edge of the core was undercut by approximately a maximum amount of 2 mils (50 $\mu$m), whereas the most wear resistant members, i.e., the stainless steel sleeves, were substantially planar but were slightly rounded at the inner and outer periphery substantially as depicted in FIG. 2. When the thus prepared sleeves 64 and 66 and the optical fibers adhered therein were abutted together within an outer close fitting sleeve assembly (not shown for purposes of clarity) the resulting connector structure was substantially as that shown in FIG. 1.

As mentioned hereinabove, only one of the abutting optical fiber surfaces needs to be prepared to have a recessed surface as provided according to the present invention. FIG. 3 shows the connection of two optical fibers according to the present invention in which only one of the fibers has thus been prepared. As shown in the left half of that figure, a 10 mil diameter (250 μm) optical fiber core 71 of silica having a 2 mil (50 μm) thick low index silicone clad 72 was inserted into a stainless steel sleeve 73 having a 15.5 mil (394 μm) inside diameter. The core and clad were then permanently anchored to the stainless steel sleeve using an epoxy resin 74. After the resin was cured, a length of the fiber and clad protruding beyond the end of the sleeve were ground such that the sleeve 73, core 71 and cladding 72 were substantially planar. The planar end of the combination was then polished as described hereinabove using a poromeric lap impregnated with American Optical M309 rouge, until the silica core 71 was undercut approximately 1 mil (25 μm) along the axis and approximately 2 mils (50 μm) at the outer diameter thereof. As shown in the right half of FIG. 3, a second optical fiber 75 of similar composition and diameter as that of fiber 71, having a silicone cladding 76 was similarly permanently anchored within a stainless steel sleeve 78 via an epoxy resin 80. This assembly was then ground to provide planar ends as described hereinabove but was not further polished to provide the undercut surface on the optical fiber 75. Such a member may still advantageously be used in combination with the assembly comprising the undercut core 71 and sleeve 73 inasmuch as the single undercut surface nonetheless precludes contact of either of the fiber surfaces with the adjoining optical elements. Such an assembly is maintained in axial alignment by inserting the respective sleeves into a close fitting outer shroud, not shown, but similar to that shown in FIG. 1.

The applicability of the connector structure of the present invention to providing an optical coupling between optical fibers of differing diameters is shown in FIG. 4. In this figure, an 8 mil (200 μm) silica fiber 82 having a low index of refraction silicone cladding layer 84 about the core 82 and further having a 3 mil (75 μm) thick jacket 86 thereon is permanently anchored within a stainless steel sleeve 88 by a 0.75 mil (19 μm) thick layer 90 of an adhesive such as epoxy resin. Subsequent to anchoring the optical fiber assembly to the sleeve 88, the end of the fiber and sleeve were ground and polished as described hereinabove to provide a convex surface on the fiber and which is recessed approximately 0.5 mil (12 μm) below the surface of the end of the sleeve 88 at the axis of the fiber and approximately 1 mil (25 μm) below the surface at the outer edge of the fiber. In this embodiment, the recess was provided in the same manner as that discussed in conjunction with the fiber shown in FIGS. 1 and 2. The right hand portion of the connector structure shown in FIG. 4 includes a 4 mil (100 μm) silica fiber core 92 which is surrounded by a 5 mil (125 μm) thick cladding material 94 of silicone. In this embodiment, an outer jacket material (not shown) extending over the cladding material was removed to facilitate the use of a smaller diameter stainless steel sleeve. The sleeve 96 was then bonded to the outer cladding material 94 by means of an organic adhesive 98 in the same manner described hereinabove. As shown in conjunction with FIG. 3, the fiber and cladding materials 92 and 94 and stainless steel sleeve 96 were ground and polished to provide a substantially planar end. To facilitate the assemblage of both sleeves 88 and 96 within a common outer shroud (not shown), the outside diameters of the sleeves 88 and 96, respectively, were selected to be substantially the same, even though the inside diameters differed in order to accommodate the various outer dimensions of the respective optical fibers.

While the embodiments disclosed with respect to FIGS. 1-4 all relate to the coupling of two optical fibers, the present invention is equally applicable to providing an optical coupling between an optical fiber and another optical element. In FIG. 5, a coupling between an optical fiber and an associated optical element, i.e., a light emitting diode (LED) is shown. In this embodiment, a 20 mil (508 μm) polymethylmethacrylate optical fiber core 100 having a 1 mil (25 μm) low index acrylic ester polymer cladding material 102 therearound is permanently mounted and recessed within a stainless steel sleeve 104 by means of a 2 mil (50 μm) layer of an organic adhesive such as an epoxy resin 106. The sleeve was selected to have an inside diameter of 26 mils (660 μm) and an outside diameter of 40 mils (1016 μm), thus leaving a concentric gap for the 2 mil (50 μm) adhesive layer. In this embodiment, the recess of the optical fiber core 100 was provided by first inserting the core through the sleeve 104 such that the fiber protruded therethrough. After the adhesive 106 had cured, the end of the fiber and sleeve were then ground flat and perpendicular to the axis of the fiber. The undercut recess on the core 100 was then provided by lapping the ground surface on a lap of a synthetic poromeric material such as Geos Company "Politex Pix" impregnated with 0.3 mm aluminum oxide polishing compound. After polishing the combined members for approximately one minute, the fiber core 100 was found to be undercut at the axis approximately 1.5 mils (38 μm) while at the edge of the core to be undercut approximately 3 mils (75 μm). The sleeve and undercut fiber core surface may conveniently be abutted against a mounting plate 108 in which a light emitting diode 110 or other optical element is mounted in an insulated recess such that the face of the LED is planar with the plate 108. When the plate is abutted against the edges of the stainless steel sleeve 104 in a suitable housing (not shown), the face of the optical fiber core 100 is nonetheless protected by a small gap thus avoiding chipping or scratching of the optical fiber and the LED and resultant optical losses.

As described hereinabove, the recess of the optical fiber below the plane of an associated sleeve results from differences in the wear rate of the respective members under a selected set of polishing conditions. For example, it has been found that optical fiber cores of silica and sleeves of Type 304 stainless steel will selectively polish to provide the desired recessed fiber surface when a soft poromeric lap material impregnated with a polishing compound of a ferric oxide rouge is provided. Similarly, optical fiber cores of a plastic material such as polymethylmethacrylate used with stainless steel sleeves have been found to result in the desired recessed fiber surface only when lapped on a soft poromeric material impregnated with a polishing compound of aluminum oxide. Other polishing compounds may also be employed but will have to be evaluated with a given set of optical fiber core, sleeve and lapping surface characteristics to determine the suitability for providing the desired recessed surface.

The sleeves useful in the embodiments described hereinabove of the present invention are preferably commercially available tubing such as the stainless steel tubing available from the Vita Needle Company, Needham, Massachusetts, which tubing is available in standard gauging tolerances and is also available on special order in a wide variety of inside and outside diameters. Thus, through judicious selection of both standard tubing and specially ordered tubing, a wide variety of coupling structures useful to interface optical fibers and associated optical elements of virtually any size may readily be provided.

As discussed hereinabove, the end of the fiber and sleeve combination are preferably polished such that the end of the fiber becomes slightly convex, the axial portion of the fiber being closest to the plane of the end portion of the sleeve but still recessed below the plane of the sleeve. Preferably, the axial portion of the fiber will become recessed less than 3 mils (75 $\mu$m) below the plane of the sleeve, and will have a radius of curvature not less than the diameter of the fiber. For example, in a typical instance, the radius of curvature on a fiber end has been found to be approximately 15 mils (375 $\mu$m) for an 8 mil diameter (200 $\mu$m) core. In such a situation, the convex end of the fiber acts as a focusing lens having a focal length of 0.84 mm. This results in focusing off-axis rays passing through the fiber such that more light is coupled into the abutted fiber or optical element. In contrast, if planar ends were provided on the fiber, more of the exiting off-axis light rays will sufficiently diverge so as not to be coupled to the abutted element. The convex surface of the polished fiber end is thus of particular value in improving the coupling between fibers or between a single fiber and an associated optical element such as a light source or photodetector. Such a convex surface is particularly useful when coupling to associated elements such as light emitting diodes or other minute light sources which are small in dimension compared to the area of the fiber core.

The various figures described hereinabove are exemplary in that they show or presuppose the inclusion of a resilient housing fitted about the sleeves to which the fibers or associated optical elements are secured so as to maintain axial alignment. In another embodiment of the present invention, such a housing may be rigid in nature and a mechanical biasing means such as a spring or resilient 0 ring or the like, similar to that used in BNC electrical connectors, may be provided to maintain the fiber-sleeve combinations in axial contact while maintaining the requisite axial alignment.

In describing the present invention hereinabove, repeated mention has been made of the relative rates of wear of the sleeve and optical fiber permanently anchored therewithin under a given set of polishing conditions. That the wear rates of the respective members are not directly related to the hardness of those members may be appreciated in that the hardness of a typical stainless steel sleeve is approximately 5.7 mohs whereas that of a typical silica core is approximately 7 mohs. Similarly, the cross-sectional area of a typical stainless steel sleeve may be approximately 500 square mils ($31.6 \times 10^{-8} m^2$), whereas the area of the silica fiber core would be approximately 50 square mils ($3.14 \times 10^{-8} m^2$). It is thus believed that the selective removal of the optical fiber core in preference to that of the surrounding sleeve is not attributable to isolated parameters such as the relative hardness or cross-sectional areas, and must be considered together with the composition of the polishing compound selected, the hardness or wear rate of that compound, and the various conditions under which polishing is performed.

Having thus described the present invention, what is claimed is:

1. A connector adapted for providing an optical coupling between an optical fiber and an associated optical element, said connector comprising
    a housing member having an opening extending between a rear portion and a front portion through which an optical fiber may be inserted to have an end of the fiber protruding beyond the end of the front portion, said front portion surrounding the opening and exhibiting a rate of wear adjacent the opening which is less than that of a protruding fiber end when both are polished under a predetermined set of polishing conditions,
    means for permanently anchoring the fiber centered within the opening in the housing member and in said protruding position to prevent relative motion therebetween, and whereupon after the fiber is permanently anchored within the housing member, the front portion of the housing member and protruding fiber end may be ground to provide substantially planar ends which are perpendicular to the axis of the fiber and subsequently polished under said predetermined set of conditions to cause the fiber end to be polished smooth and slightly recessed within the front portion of the housing member as a result of differences in the rates of material removal, and wherein the
    housing member further comprises means for maintaining the recessed fiber end axially aligned with, and the planar front portion abutting a support for an associated optical element and for enclosing the interface therebetween to prevent foreign elements from contacting the fiber end, thereby minimizing optical losses, while the recessed fiber end in the housing member results in a small gap between the fiber end and the associated optical element and thereby prevents degradation in optical efficiency as may otherwise result from chipping or scratching of the fiber end due to contact with other members during repeated connections or disconnections or when connected and in use.

2. A connector according to claim 1 adapted for providing an optical coupling between a pair of optical fibers, comprising a mating pair of said housing members, each being adapted to receive and anchor therein an end of one of said pair of fibers, wherein a front portion of each member and protruding fiber end are ground to provide substantially planar ends which are substantially perpendicular to their respective axes, wherein at least one of the respective fiber ends are polished smooth and slightly recessed within the front portion of its associated housing member as a result of differences in the respective rates of removal under predetermined polishing conditions, and wherein the mating housing members are adapted to receive and enclose both fibers such that the substantially planar front portions of both housing members are maintained axially butted together.

3. A connector according to claim 1, wherein the protruding end of a fiber within a housing member is ground and polished such that said substantially planar end is slightly convex, the axial portion thereof being closest to the plane of the end portion but still recessed therebelow.

4. A connector according to claim 3, wherein the axial portion of the fiber is recessed less than 3 mils (75 $\mu$m) below the plane of the end portion of the housing member.

5. A connector according to claim 3, wherein the slightly convex fiber end has a radius of curvature of not less than the diameter of the fiber.

6. A connector according to claim 1, wherein said front portion of the housing member comprises a metal composition and is adapted for use with an optical fiber having a core of a non-metallic material.

7. A connector according to claim 6, wherein the optical fiber further comprises a cladding around the core, the rate of removal of the cladding under said predetermined set of polishing conditions being greater than that of the core.

8. A connector according to claim 1, comprising at least two resilient mating housing members, one of which is secured to a said recessed fiber and one of which is secured to a said associated optical element, which resilient members are adapted to be force fitted together to maintain said axial alignment.

9. A connector according to claim 1, wherein said housing member comprises at least one tubular sleeve anchored within the housing and having a circular opening extending therethrough, said sleeve thus providing the opening in the housing which is adapted to receive and anchor a said optical fiber inserted therethrough, and exhibiting a rate of wear less than that of the fiber under said predetermined set of polishing conditions such that upon such polishing an end of a fiber becomes recessed within the end of the sleeve.

10. A connector according to claim 9, wherein the housing member further includes a second tubular sleeve anchored within the housing and having a circular opening extending therethrough of substantially the same diameter as the outer diameter of the first sleeve, and into at least a portion of which the first sleeve having the recessed fiber end therein may be inserted and into the opposite end of which another sleeve of the same outer diameter as the first sleeve and having another fiber anchored therein may be inserted such that the smaller sleeves become butted together and axially aligned.

11. A connector according to claim 1, adapted for providing an optical coupling between a said optical fiber and another optical element, including a said housing member adapted to receive and anchor therein an end of a said optical fiber, wherein a front portion of said member and a fiber end protruding therethrough may be ground to provide substantially planar ends which are substantially perpendicular to the fiber axis and subsequently polished under said predetermined set of polishing conditions to provide a smooth and recessed fiber end, and further including a mating housing member having a front portion adapted to provide a substantially planar end which may be butted against the planar front portion of the other housing member and which encloses and positions a said associated optical element therein such that said fiber recessed in the front portion of the first recited housing member is optically coupled to the associated optical element when both housing members are mated together such that the respective front portions are butted together.

12. A connector according to claim 11, wherein said first recited housing member comprises at least one tubular sleeve anchored within the housing, said sleeve having a circular opening extending therethrough, thus providing the opening in the housing which is adapted to receive and anchor a said optical fiber therethrough, and exhibiting a rate of wear less than that of the fiber under said predetermined set of polishing conditions such that upon such polishing, an end of a fiber becomes recessed within the end of the sleeve.

13. A connector according to claim 12, wherein the first recited housing member further includes a second tubular sleeve anchored within the housing and having a circular opening extending therethrough of substantially the same diameter as the outer diameter of the first sleeve, and into at least a portion of which the first sleeve having the recessed fiber end therein may be inserted and into the opposite end of which another sleeve of the same outer diameter as the first sleeve and having another fiber anchored therein may be inserted such that the smaller sleeves become butted together and axially aligned, and wherein said mating housing member includes said another sleeve of the same outer diameter as the first sleeve of the first recited member, said another sleeve having therewithin an optical fiber coupled to said associated optical element such that when both housing members are mated together the respective sleeves enclosing the fibers are butted together to optically couple the fibers and optical element.

14. A method for optically coupling an optical fiber to an associated optical element comprising
   (a) providing a housing member having an opening of a predetermined diameter extending between a front portion and a rear portion for receiving an optical fiber, which front portion surrounds the opening and is characterized by a rate of wear less than that of the fiber when both are polished under a predetermined set of conditions,
   (b) inserting a said fiber into the rear portion of the opening such that an end of the fiber protrudes beyond said front portion,
   (c) permanently anchoring together the associated fiber and housing member in said protruded position to prevent relative movement,
   (d) grinding the protruding end of the fiber and front portion of the housing member to provide substantially co-planar ends on the front portion and on the fiber which are perpendicular to the axis, and
   (e) polishing the co-planar ends of the fiber and front portion under a said predetermined set of polishing conditions to cause the fiber end to be polished smooth and slightly recessed within the front portion of the housing member as a result of a difference in material removal rates under said predetermined conditions,
such that when the front portion is butted-up against a support for an associated optical element and the axis of the recessed fiber is optically aligned with the element, the recess results in a small gap along the axis and thereby prevents degradations in optical efficiency as may otherwise result from chipping or scratching of the fiber end or other members due to mutual contact during repeated connections and disconnections or when connected and in use.

15. A method according to claim 14, further comprising
   (f) providing a mating housing member having a substantially planar front portion surrounding an opening therethrough, mating means for cooperatively coupling with the first recited housing member for maintaining the respective front portions butted-up against each other with the respective openings therethrough axially aligned and for enclosing the front portions to prevent foreign impurities from contacting the fiber end, and a cavity therein for receiving and anchoring a said associated optical element such that the element is optically coupled to the opening through the front portion, (g) assembling a said associated element within said housing, and (h) mating the respective housing members to complete the optical coupling.

16. A method according to claim 14, wherein said polishing includes providing a resilient and partially conformable surface and a polishing compound, polishing the exposed fiber and front portion of the housing member against the surface such that the more wear resistant front portion is less affected while the resilient member conforms into the less wear resistant fiber and results in preferential removal thereof.

17. A method according to claim 14, comprising polishing the ends of the fiber and front portion of the housing member under said predetermined polishing conditions including an appropriate polishing duration and pressure to provide a slightly convex fiber end, the axial portion thereof being closest to the plane of the end portion but still recessed therebelow.

18. A method according to claim 17, wherein the resilient polishing surface comprises a poromeric material.

19. A method according to claim 18, wherein the poromeric material is impregnated with a polishing compound of $Al_2O_3$ or gamma $Fe_2O_3$.

20. A method according to claim 14, comprising providing as a component of said housing member a tubular sleeve member having a circular cross-sectional opening extending therethrough, and a periphery adapted to mate with the remainder of the housing to be anchored therein, said sleeve thus providing the opening in the housing into which is inserted and permanently anchored the optical fiber and the front portion of which is characterized by the rate of wear less than that of the fiber, grinding and polishing a fiber permanently anchored within the sleeve member to cause the fiber end to be recessed therewithin, and mounting the thus prepared fiber-sleeve combination within the remainder of the housing member.

21. A method according to claim 20, comprising preparing a combination of a plastic fiber and steel sleeve member by first grinding the fiber flush with the sleeve utilizing 600 mesh SiC and subsequently undercutting the fiber by polishing the combination on a poromeric lap impregnated with 0.3 $\mu$m $Al_2O_3$ polishing compound.

22. A method according to claim 20, comprising preparing a combination of a plastic clad silica fiber and steel sleeve member by first grinding the fiber flush with the sleeve utilizing 600 mesh SiC and subsequently undercutting the fiber end by polishing the combination on a poromeric lap impregnated with 1.0 $\mu$m $Fe_2O_3$ rouge.

23. A connector providing an optical coupling between an optical fiber and an associated optical element, said connector structure comprising (a) at least one tubular sleeve having a circular cross-sectional opening axially extending therethrough, said opening having a diameter slightly greater than the outside diameter of an optical fiber to be inserted therethrough, said sleeve exhibiting a rate of wear less than that of the fiber when polished under a predetermined set of conditions and having an end portion surrounding said opening through which a said optical fiber inserted through the sleeve may protrude, (b) at least one optical fiber inserted through a said sleeve in said protruding position, (c) means for permanently anchoring the fiber centered within the sleeve in said protruding position to prevent relative motion therebetween, and whereupon after the fiber is permanently anchored within the sleeve to provide a sleeve-fiber combination, the end portion of the sleeve and protruding fiber of the combination is ground to provide a substantially planar end on the sleeve and fiber combination which is perpendicular to the axis, after which the planar end is polished under said predetermined polishing conditions to cause the fiber end to be polished smooth and slightly recessed within the end portion of the sleeve as a result of differences in the rates of material removal, and (d) housing means for enclosing the sleeve-fiber combination and for maintaining the substantially planar end of the sleeve axially butted-up against a said associated optical element to prevent dirt and other impurities from contacting the fiber end thereby minimizing optical losses, while the recess of the fiber end within the sleeve results in a small gap between the fiber end and the associated optical element and thereby prevents degradation in optical efficiency as may otherwise result from chipping or scratching of the fiber end due to contact with other members during repeated connections and separations.

24. A connector adapted for providing an optical coupling between an optical fiber and an associated optical element, said connector comprising a housing member having an optical fiber permanently anchored and extending between a rear portion and a front portion of the housing and protruding beyond the end of the front portion, said front portion exhibiting a rate of wear adjacent the fiber end which is less than that of the fiber end when both are polished under a predetermined set of polishing conditions, whereupon the front portion of the housing member and protruding fiber end may be ground to provide substantially planar ends which are pependicular to the axis of the fiber and subsequently polished under said predetermined set of conditions to cause the fiber end to be polished smooth and slightly recessed within the front portion of the housing member as a result of differences in the rates of material removal, and wherein the housing member further comprises means for maintaining the recessed fiber end axially aligned with, and the planar front portion abutting a support for an associated optical element and for enclosing the interface therebetween to prevent foreign elements from contacting the fiber end, thereby minimizing optical losses, while the recess of the fiber end results in a small gap between the fiber end and the associated optical element and thereby prevents degradation in optical efficiency as may otherwise result from chipping or scratching of the fiber end due to contact with other members during repeated connections or disconnections when connected and in use.

* * * * *